United States Patent [19]

Zepnik et al.

[11] Patent Number: 5,641,193
[45] Date of Patent: Jun. 24, 1997

[54] CONVERTIBLE PASSENGER CAR

[75] Inventors: Siegfried Zepnik, Niefern-Oeschelbronn; Matthias Aydt, Eberdingen; Kurt Pfertner, Ditzingen; Uwe Henn, Wimsheim, all of Germany

[73] Assignee: Dr. Ing. h.c.F. Porsche AG, Germany

[21] Appl. No.: 419,541

[22] Filed: Apr. 10, 1995

[30] Foreign Application Priority Data

Apr. 8, 1994 [DE] Germany .................. 44 12 109.1

[51] Int. Cl.$^6$ .................. B60J 7/12; B60R 21/13
[52] U.S. Cl. .................. 296/107; 296/197; 280/756
[58] Field of Search .................. 280/756; 296/107, 296/108, 116, 117, 196, 197, 210

[56] References Cited

U.S. PATENT DOCUMENTS

| | | | |
|---|---|---|---|
| 2,697,633 | 12/1954 | Slason | 296/116 |
| 4,711,485 | 12/1987 | Maebayashi et al. | 280/756 X |
| 4,842,326 | 6/1989 | Divito | 296/196 |
| 5,018,780 | 5/1991 | Yoshii et al. | 296/203 |

FOREIGN PATENT DOCUMENTS

| | | | |
|---|---|---|---|
| 0454279 | 10/1991 | European Pat. Off. | |
| 1539482 | 9/1968 | France. | |
| 2601906 | 1/1988 | France | 296/107 |
| 3127525 | 1/1983 | Germany | 280/756 |
| 3204526 | 8/1983 | Germany | 296/210 |
| 8523831 U | 11/1985 | Germany. | |
| 4100506C1 | 5/1992 | Germany. | |
| 5238339 | 9/1993 | Japan | 280/756 |

*Primary Examiner*—Dennis H. Pedder
*Attorney, Agent, or Firm*—Evenson, McKeown, Edwards & Lenahan, P.L.L.C.

[57] ABSTRACT

A passenger, particularly a convertible, has a top and a rollover protection arrangement. In order to simplify the mounting of the top and the rollover protection device on the vehicle, while the fastening is appropriate with respect to its function, and in order to reduce the assembling time on the assembly line, the rollover protection device and the top are combined to form a pre-assembled constructional unit produced outside the vehicle.

9 Claims, 3 Drawing Sheets

5,641,193

CONVERTIBLE PASSENGER CAR

BACKGROUND AND SUMMARY OF THE INVENTION

The present invention relates to a passenger car, particularly a convertible, comprising a top and a rollover arrangement.

DE-GM 85 23 831 shows a convertible which has a foldable top and a rollover arrangement arranged behind the front seats. The rollover arrangement is formed by a stationary rollover bar fastened on the vehicle floor. During series production, the top and the rollover arrangement are fastened to the body separately from one another. Particularly, for the body-side pivotal connection of the top, corresponding reinforcing measures must be provided on the shell, and this necessity increases the cost and the weight.

It is an object of the present invention to improve a convertible comprising a top and a rollover protection arrangement such that, in the fastening appropriate to its function, the mounting of the top and the rollover protection arrangement on the vehicle is simplified and the assembling time on the assembly line is reduced.

This object has been achieved according to the present invention by combining the rollover protection arrangement and the top to form a pre-assembled constructional unit produced outside the vehicle.

Principal advantages achieved with the present invention are that, as a result of the combination of the rollover protection arrangement and the top to form a prefabricated constructional unit, the mounting on the vehicle is facilitated significantly. The rollover protection arrangement represented by a rollover bar has a relatively torsionally stiff construction and therefore represents a stable base for the bearing of the top.

Reinforcing measures on the body-shell-side in the area of the bearing of the top may be omitted which reduces weight and cost. Fastening and deflecting points of a seat belt arrangement are also integrated in the prefabricated constructional unit. Thus, upwardly projecting humps provided in the area of the belt line for the upper belt deflecting point on the vehicle body can be omitted.

Without any expenditures on the shell side, the upper deflecting points may be arranged on the rollover bar at a relatively high level and therefore take up an optimal position with respect to the safety of the occupants. A belt roller and possibly a belt tightener of the seat belt arrangement are mounted on a forward frame part of the rollover bar.

BRIEF DESCRIPTION OF THE DRAWINGS

These and other objects, features and advantages of the present invention will become more readily apparent from the following detailed description when taken in conjunction with the accompanying drawings wherein.

DETAILED DESCRIPTION OF THE DRAWINGS

Figure 1:
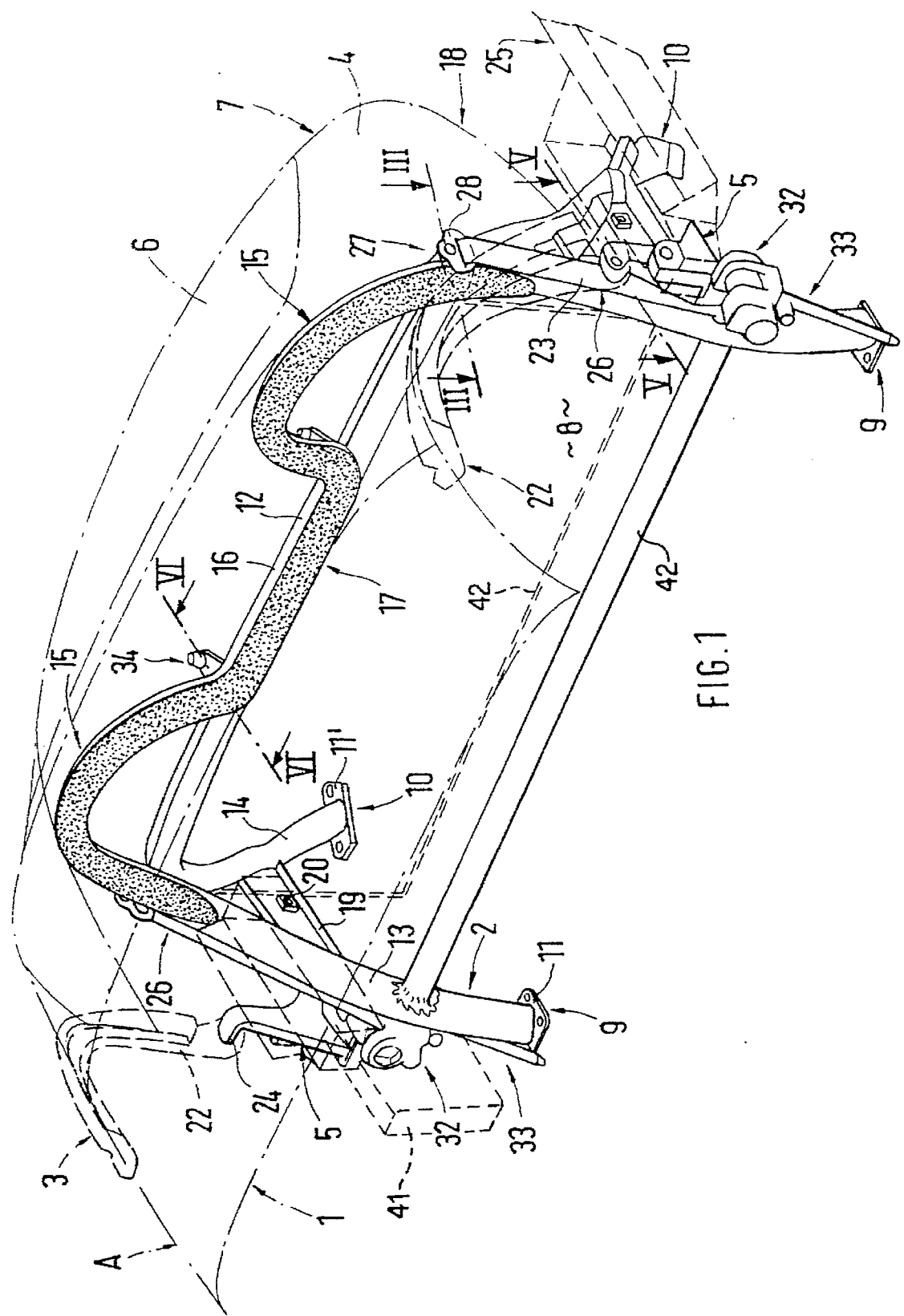
FIG. 1 is a perspective view from the front of a prefabricated constructional unit consisting of a rollover bar and a top.
Figure 2:
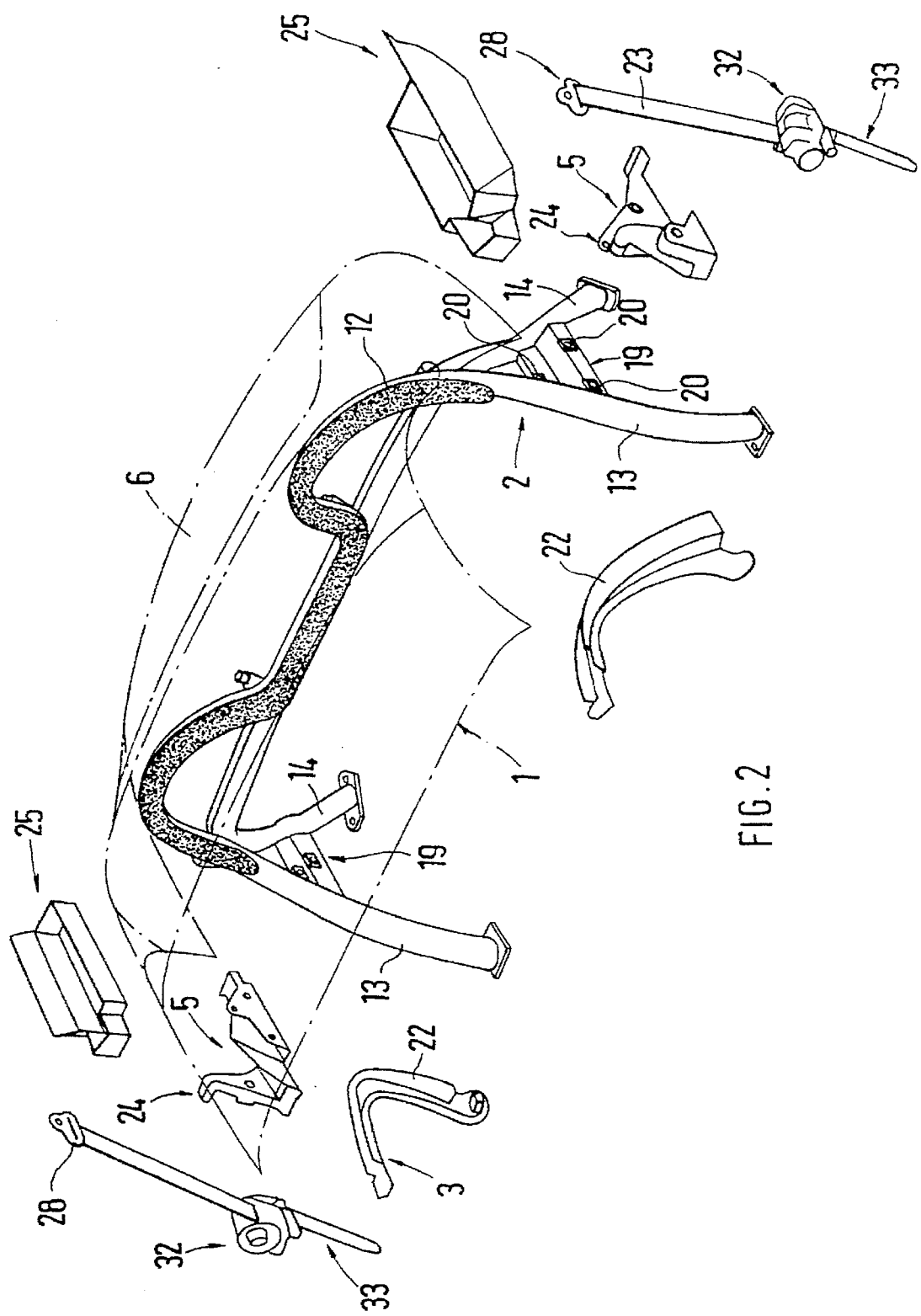
FIG. 2 is an exploded view of components of the constructional unit of FIG. 1.

An open passenger car formed by a two-seat convertible (not shown in detail) comprises a top designated generally by numeral 1 and a rollover protection arrangement designated generally by numeral 2.

The folding top 1 comprises a folding top linkage 3 and an elastic top cover 4 connected with the linkage. The folding top linkage 3 is rotatably disposed on two laterally exterior top bearings 5. In the rearward area of the top cover 4, a rear window 6 is provided which can be rigid or flexible.

In a closed position A (shown in dot-dash lines), the top 1 extends between a windshield frame (not shown) and a rear area 7 of the passenger car and covers a passenger compartment 8 in a known manner. The top 1, by way of locks on the windshield frame are held in position in a detachable manner. In the folded position, the top 1 is swivelled rearward into the rear area and either rests on the rear area or is housed in a folding top compartment which is covered in the upward direction by a top compartment cover. Behind the two front seats of the passenger car (not shown), the rollover protection arrangement 2 in the illustrated embodiment, is formed by a stationary rigid rollover bar 12 composed of several tube-shaped frame steel or light metal parts and fastened on laterally exterior lower ends 9, 10, by mounting plates 11, 11', to the stationary vehicle body by screwing, welding, or the like.

Figure 3:
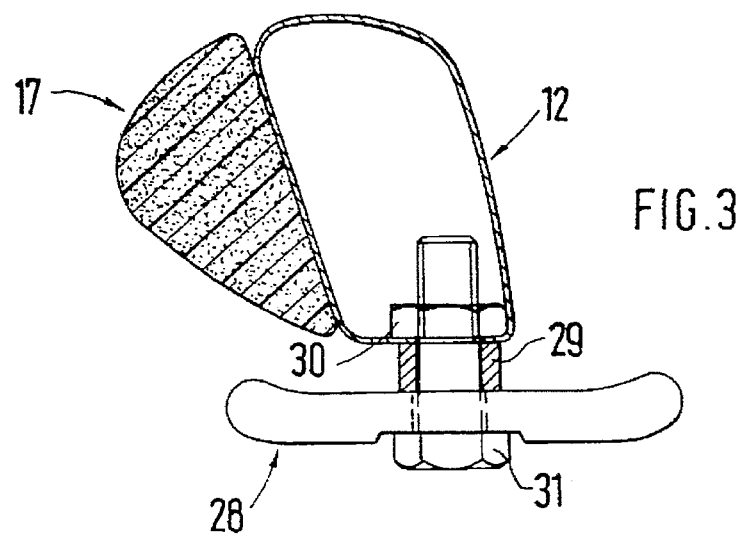
FIG. 3 is an enlarged sectional view along line III—III of FIG. 1.
Figure 4:
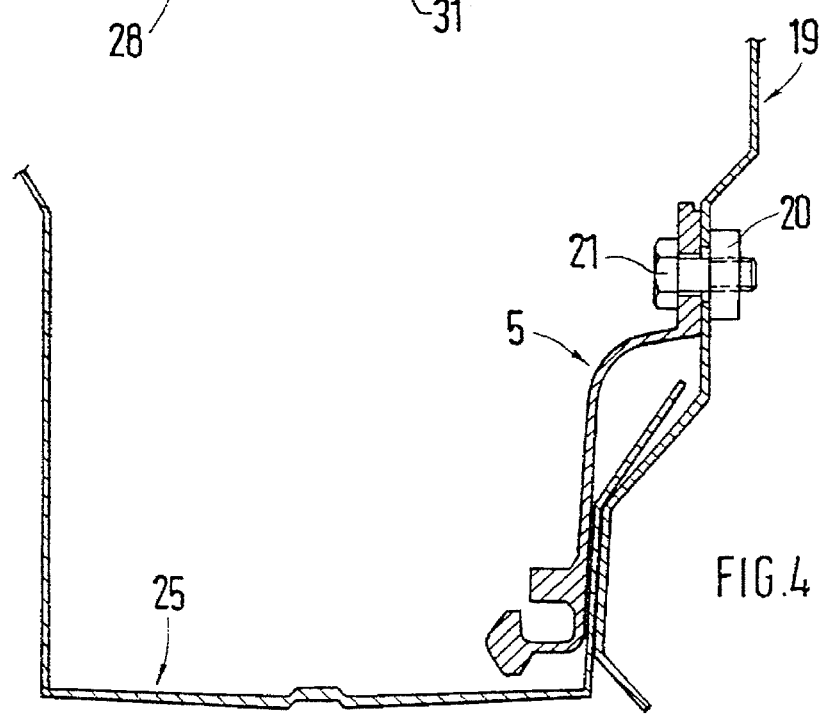
FIG. 4 is an enlarged sectional view along line IV—IV of FIG. 1.
Figure 5:
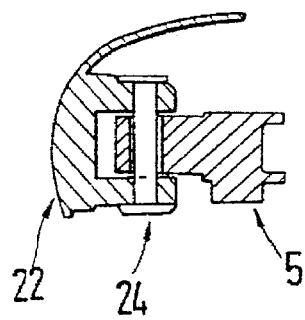
FIG. 5 is an enlarged sectional view along line V—V of FIG. 1.

On its two longitudinal sides, the rollover bar 12 comprises respective upright extending, forward supporting sections 13 and rearward supporting section 14, as well as two transversely extending bow-shaped sections 15 which are connected to one another by a horizontally extending connection area 16. As seen in FIGS. 1 and 3, the rollover bar 12 is provided in sections with a cushioning 17 on the side facing the occupants. In accordance with the present invention, the rollover arrangement 2 and the top 1 are combined outside the vehicle to form a pre-assembled constructional unit 18.

On each longitudinal side between the forward upright supporting section 13 and the rearward upright supporting section 14, the rollover bar 12 has a console 19 which reinforces the rollover bar 12 and extends in the longitudinal direction of the vehicle. The bearing 5 of the top 1 is fastened to the console 19. For this purpose, weld nuts 20, rim holes, or the like, into which the fastening screws 21 are screwed, are provided locally on the console 19. The rollover bar 12 has a relatively torsionally stiff construction and therefore represents a stable base for the holding of the foldable top 1.

Of the folding top linkage 3, FIG. 1 shows only B-column links 22, which are rotatably linked to the top bearing 5 at a location designated by numeral 24. The folding top linkage 3 can have any suitable shape. One respective water box 25, which is open in the upward direction, is clamped in and held in position between each console 19 and the folding top bearing 5.

For protecting the occupants sitting on the front seats, a seat belt arrangement 26 is provided which is formed by two 3-point seat belts which are arranged separately from one another. The 3-point seat belts may be arranged either directly on the seat or, according to another embodiment of the present invention, may be integrated at least partially into the prefabricated constructional unit 18.

According to FIGS. 1 and 3, one swivellable deflection fitting 28 of the seat belt arrangement 26 respectively is arranged in an upper, laterally exterior area 27 of a bow-shaped section 15 of the rollover bar 12. The deflection fitting 28 forms an upper belt deflecting point and is fastened on the rollover bar 12 by a spacer piece 29. For this purpose, a threaded bore or a weld nut 30 is provided on the rollover bar 12 into which a fastening screw 31 is screwed. Furthermore, the lower belt rollers 32 of the seat belt arrangement 26 are held in position on the rollover bar 12, specifically on the forward upright supporting section 13 below the console 19. The deflection fitting 28 can also be fastened on the side of the bow-shaped section 15 which is oriented toward the vehicle center, whereas the belt rollers 32 can be fastened on the transversely extending connection area 16.

In the illustrated embodiment, the belt rollers 32 each have an integrated belt tightener 33. When the seat belt is worn, the belt strap 23 extends from the lower belt roller 32 to the upper deflection fitting 28 and is then guided over the occupant's shoulder diagonally downward and inward in the direction of the longitudinal center plane of the vehicle and is detachably held in position there in a lower belt fastening point.

Figure 6:
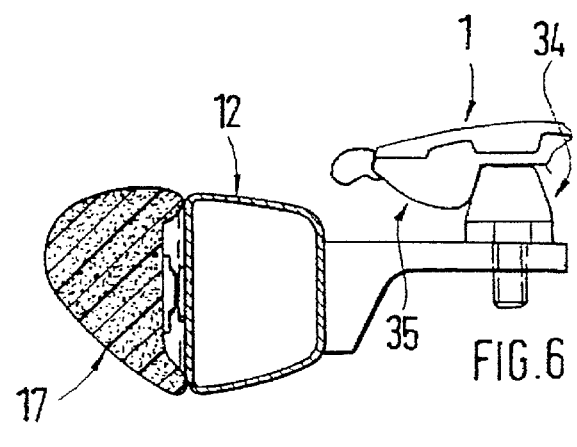
FIG. 6 is an enlarged sectional view along line VI—VI of FIG. 1.

On an upper transversely extending connection area 16 of the rollover bar 12, on the side facing away from the occupants as seen in FIG. 6, a fixing device 34 is provided locally which, when the folding top 1 is folded back, interacts with a forward, transversely extending frame part 35 of the top 1 and holds the top 1 in this position. In addition, approximately at the level of the fastening of the belt roller 32, the rollover bar 12 may have a second transverse connection in the shape of a tube (shown schematically in FIG. 1) which connects the two forward supporting sections 13 with one another. This transverse connection acts as a crash support or as a transverse reinforcement in the case of a lateral impact in order to ensure a survival space which is as large as possible.

A side air bag 41 shown schematically in dash lines in FIG. 1 may also be fastened on the forward supporting section 13 of the rollover bar 12. Moreover, a wind partition 42 shown schematically in double-dash lines in FIG. 1 can be mounted on the transversely extending connection area 16. The wind partition may be fastened, for example, by a plug-type connection on the transversely extending connection area. The wind partition can also have a construction which is similar to that of a blind, in which case the blind box can be fastened with the axis of rotation on the transversely extending connection area.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A passenger vehicle, comprising a pre-assembled constructional unit consisting of a foldable top and a separate rollover protection arrangement comprising a stationary rollover bar operatively associated with the foldable top, wherein the pro-assembled constructional unit is configured such that the top and the rollover protection arrangement which have been pre-assembled are thereby assembleable simultaneously in the passenger vehicle.

2. The passenger vehicle according to claim 1, wherein the stationary rollover bar is fastened on laterally exterior lower ends thereof by mounting plates to a stationary vehicle body.

3. The passenger vehicle according to claim 2, wherein the rollover bar has, on each longitudinal side thereof, between a forward supporting section and a rearward supporting section, a console, configured and arranged to reinforce the rollover bar and extending in a longitudinal direction of the vehicle, on which console is fastened a folding top bearing of the folding top which comprises a folding top linkage and an elastic folding top cover.

4. The passenger vehicle according to claim 1, wherein the pre-assembled constructional unit comprises a seat belt arrangement.

5. The passenger vehicle according to claim 4, wherein one swivellable upper deflection fitting respectively of the seat belt arrangement is rotatably arranged in upper areas which are one of laterally exterior and interior areas of bow-shaped sections of the rollover bar.

6. The passenger vehicle according to claim 4, wherein the rollover bar has two forward supporting sections, one on each side of the rollover bar, and a belt roller of the respective seat belt arrangement is fastened on one of the two forward supporting sections and a transversely extending connection area of a rollover bar comprising the rollover protection arrangement.

7. The passenger vehicle according to claim 6, wherein one swivellable upper deflection fitting respectively of the seat belt arrangement is rotatably arranged in upper areas which are one of laterally exterior and interior areas of bow-shaped sections of the rollover bar.

8. The passenger vehicle according to claim 3, wherein a fixing device is provided on a horizontally aligned, transversely extending connection area of the rollover bar on a side thereof opposite a space for vehicle occupants and is arranged to fix the folding top which is configured to be folded back toward the rear of the vehicle.

9. The passenger vehicle according to claim 3, wherein the rollover bar has a tube-shaped transverse connection approximately at a level of fastening of the belt rollers to connect the two forward supporting sections.

* * * * *